United States Patent
Watanabe (10) Patent No.: US 10,620,886 B2
(45) Date of Patent: Apr. 14, 2020

(54) IMAGE FORMING APPARATUS, IMAGE FORMING METHOD, AND RECORDING MEDIUM

(71) Applicant: Hodaka Watanabe, Kanagawa (JP)

(72) Inventor: Hodaka Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/293,733

(22) Filed: Mar. 6, 2019

(65) Prior Publication Data

US 2019/0286382 A1 Sep. 19, 2019

(30) Foreign Application Priority Data

Mar. 15, 2018 (JP) .................. 2018-048237

(51) Int. Cl.
*H04N 1/00* (2006.01)
*G06F 3/12* (2006.01)

(52) U.S. Cl.
CPC .......... *G06F 3/1205* (2013.01); *G06F 3/1219* (2013.01); *G06F 3/1258* (2013.01); *G06F 3/1288* (2013.01)

(58) Field of Classification Search
CPC ............................. G06F 3/1205; G06F 3/1258
USPC ....................................................... 358/1.13
See application file for complete search history.

(56) References Cited

U.S. PATENT DOCUMENTS

| 7,856,202 B2 * | 12/2010 | Mizobuchi ............. G03G 21/02 399/389 |
| 2011/0235114 A1 * | 9/2011 | Saitoh ................ H04N 1/00233 358/1.15 |
| 2012/0262742 A1 | 10/2012 | Yano et al. |
| 2018/0060004 A1 | 3/2018 | Watanabe |

FOREIGN PATENT DOCUMENTS

| JP | 7-298038 | 11/1995 |
| JP | 2012-223891 | 11/2012 |
| JP | 2017-162072 | 9/2017 |
| JP | 2018-030352 | 3/2018 |

* cited by examiner

*Primary Examiner* — Saeid Ebrahimi Dehkordy
(74) *Attorney, Agent, or Firm* — Oblon, McClelland, Maier & Neustadt, L.L.P.

(57) ABSTRACT

An image forming apparatus includes: a control panel to receive selection of a print job from a user; a sensor to detect a state of an expendable of the image forming apparatus; an image forming device to form an image on a recording medium; and a processor to: control the control panel to display a saving setting screen for setting saving of the expendable in the print job, based on information indicating a state of the expendable at the time of executing the print job and a print condition of print data indicated by the print job; and execute the print job according to saving setting of the expendable that is set using the saving setting screen, to control the image forming device to form an image of the print data.

11 Claims, 5 Drawing Sheets

IMAGE FORMING APPARATUS, IMAGE FORMING METHOD, AND RECORDING MEDIUM

CROSS-REFERENCE TO RELATED APPLICATIONS

This patent application is based on and claims priority pursuant to 35 U.S.C. § 119(a) to Japanese Patent Application. No. 2018-048237, filed on Mar. 15, 2018, in the Japan Patent Office, the entire disclosure of which is hereby incorporated by reference herein.

BACKGROUND

Technical Field

The present invention relates to an image forming apparatus, an image forming method, and a recording medium.

Discussion of the Background Art

Conventionally, there have been various techniques for setting an amount of toner used at the time of printing. For example, there is a technique for determining whether or not to save toner based on a condition of toner saving set by a user.

However, under predetermined conditions, toner is automatically saved without giving an option to the user. Therefore, there has been a possibility that an image is printed according to settings which is not intended by the user.

SUMMARY

Example embodiments of the present invention include an image forming apparatus including: a control panel to receive selection of a print job from a user; a sensor to detect a state of an expendable of the image forming apparatus; an image forming device to form an image on a recording medium; and a processor to: control the control panel to display a saving setting screen for setting saving of the expendable in the print job, based on information indicating a state of the expendable at the time of executing the print job and a print condition of print data indicated by the print job; and execute the print job according to saving setting of the expendable that is set using the saving setting screen, to control the image forming device to form an image of the print data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an image forming apparatus, an image forming method, and an image forming control program will be described below in detail with reference to the accompanying drawings. As described below, in a printing control system which accumulates and prints print jobs, when setting of print conditions (color, printing side, number of copies, and the like) is changed at the time of output, whether or not to display saving setting and default setting can be changed for each user based on Capability information (toner amount, paper sheet, and the like) of a Multi-function Peripheral (MFP) at the time of output. Furthermore, in a case where a plurality of accumulated jobs is collectively printed, whether or not to collectively apply the saving setting to the plurality of jobs is determined.

Figure 1:
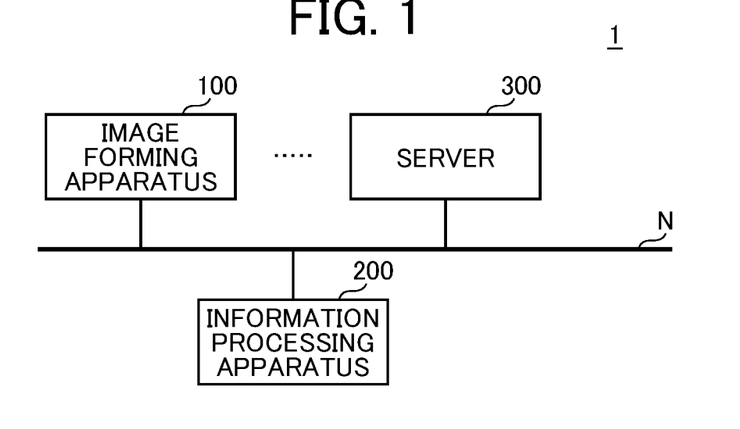
FIG. 1 is a diagram of an exemplary configuration of a print control system.

FIG. 1 is a diagram of an exemplary configuration of a print control system 1 according to the present embodiment. As illustrated in FIG. 1, in the print control system 1, an image forming apparatus 100, an information processing apparatus 200, and a print management server 300 are connected via a network N which is a communication network such as the Internet.

The image forming apparatus 100 is provided with the function of image forming such as a print function and is, for example, an MFP and a Laser Printer (LP). The information processing apparatus 200 has information processing functions and is, for example, a Personal Computer (PC). The print management server 300 is a server which manages a job to print from the image forming apparatus 100 and the like.

The print control system 1 according to the present embodiment provides a printing service as follows to a user. For example, a print job is transmitted from the information processing apparatus 200 to the print management server 300, and the print job is accumulated in the print management server 300. In addition to print data to be actually printed from the image forming apparatus 100, the print job includes print conditions to be used for printing the print data. For example, information regarding print conditions of print data includes print attribute such as color printing and monochrome printing, side to be printed such as single-sided printing and double-sided printing, printing orientation, and the number of copies.

In the following examples, a user logs in the image forming apparatus 100 via an operation screen displayed on a control panel 120 of the image forming apparatus 100. The image forming apparatus 100 obtains a list of print jobs of the user who has logged in, which are accumulated in the print management server 300, and displays the obtained list on the operation screen. Then, the image forming apparatus 100 selects a print job from among the print jobs according to an instruction from the user who has logged in, and prints an image according to the selected print job.

Figure 2:
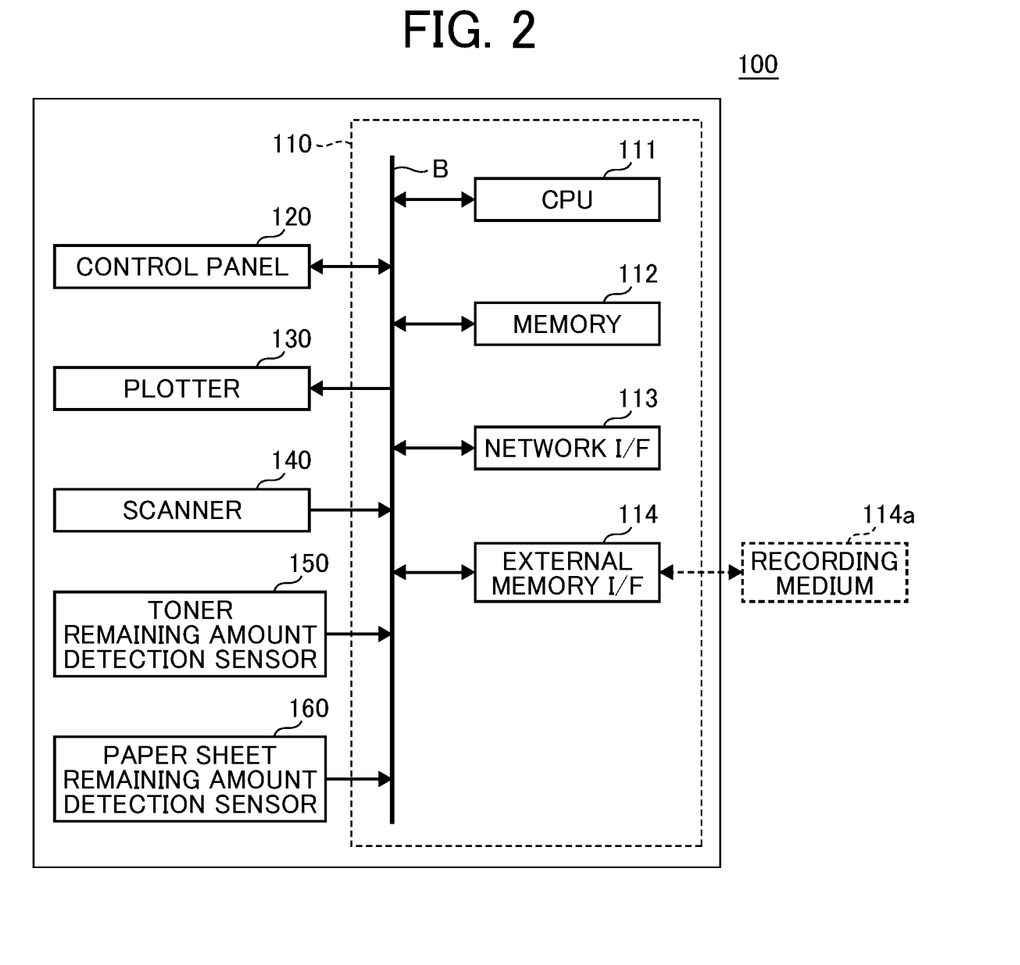
FIG. 2 is a diagram of an exemplary hardware configuration of an image forming apparatus.

FIG. 2 is a diagram of an exemplary hardware configuration of the image forming apparatus 100 according to the present embodiment. In FIG. 2, an example in a case where the image forming apparatus 100 is an MFP is illustrated.

As illustrated in FIG. 2, the image forming apparatus 100 includes a controller 110, the control panel 120, a plotter 130, a scanner 140, a toner remaining amount detection sensor 150, and a paper sheet remaining amount detection sensor 160, which are electrically connected to each other via a bus B.

The control panel 120 includes a display and an input device and provides various information such as device information to the user and accepts various user operations such as operation setting and operation instructions. The plotter 130 includes an image forming unit that forms an image on a recording sheet. A method for forming the image may be an electrophotographic method or an inkjet method. The scanner 140 optically reads a document into a read image.

The controller 110 includes a Central Processing Unit (CPU) 111, a memory 112, a network interface (I/F) 113, and an external memory I/F 114, which are connected with each other via the bus B.

The CPU 111 executes a program to control the entire image forming apparatus. The memory 112 stores the program and various data (for example, "image data"). The memory 112 is, for example, a Random Access Memory (RAM) as a volatile memory, a Read Only Memory (ROM) as a nonvolatile memory, and a Hard Disk Drive (HDD) with a large memory space. The RAM functions as a work area (memory area in which program and data are temporarily read) of the CPU 111. The ROM and the HDD are used as storage destinations of programs and various data. Accordingly, in the image forming apparatus 100, the CPU 111 reads the program stored in the ROM on the RAM, and executes the program.

The program may be recorded in a computer-readable recording medium such as a Universal Serial Bus (USB) memory in an installable format file or executable format file to be provided or may be stored in other computer connected to the network such as the Internet and downloaded via the network to be provided or distributed.

The network I/F 113 is an interface for connecting the image forming apparatus 100 to the network N as a data transmission line. With this structure, the image forming apparatus 100 can perform data communication with the information processing apparatus 200 and the print management server 300 via the network I/F 113.

The external memory I/F 114 is an interface for connecting a recording medium 114*a* which is an external memory. The recording medium 114*a* is, for example, an SD memory card and a Universal Serial Bus memory (USB). Accordingly, the image forming apparatus 100 can read and/or write to the recording medium 114*a* via the external memory I/F 114.

For the toner remaining amount detection sensor 150, for example, a piezoelectric sensor and a transmission light sensor can be used. The toner remaining amount detection sensor 150 detects a remaining amount of toner of the image forming apparatus 100.

The paper sheet remaining amount detection sensor 160 includes a detection unit, which includes a movable filler as a state detection member for detecting a paper sheet by blocking light between a light emitting element and a light receiving element with a photo sensor, a limit switch, and the like. The detection unit detects a remaining amount of the paper sheets in the image forming apparatus 100.

Figure 3:
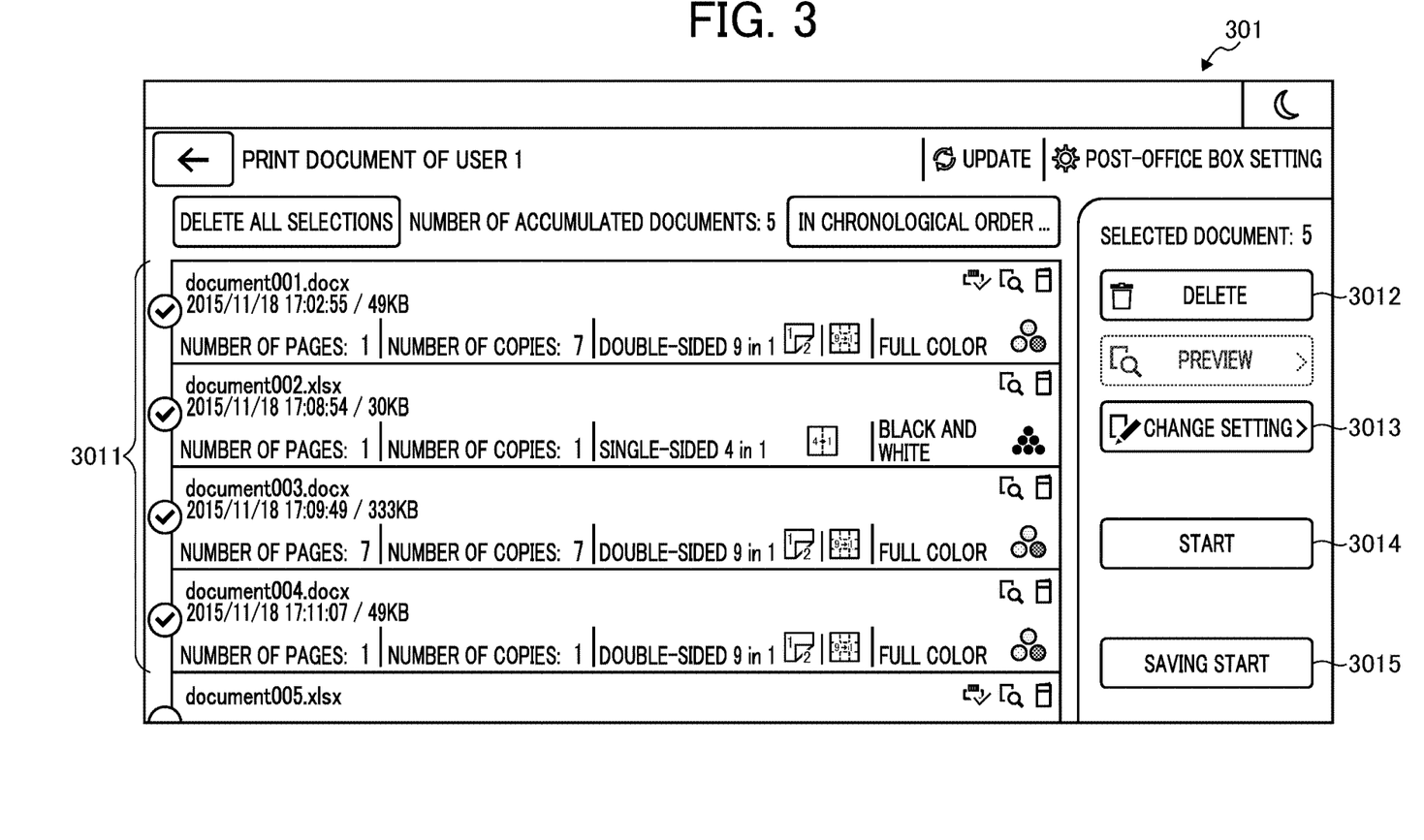
FIG. 3 is a diagram of an example of a job list display screen displayed on an operation screen of a control panel.

FIG. 3 is a diagram of an example of a job list display screen displayed on an operation screen of the control panel 120. The job list display screen is a screen which is displayed after the user has logged in the image forming apparatus 100 and the user has been selected from a user list which is displayed after login and is used to execute a print job (print job execution screen). On the job list display screen, a list of print jobs accumulated in the print management server 300 by the user who has logged in the image forming apparatus 100 is displayed. Specifically, a job list display screen 301 includes a job list 3011 that lists the print jobs, a selection key 3012 for selecting a job to be printed from the job list 3011, a setting change key 3013 for making various setting and changing the setting when the print job is executed, and a start (execution) key 3014 for executing the print job and printing without executing saving setting to be described later. FIG. 3 illustrates a case where, after the selection key 3012 has been operated and four print jobs have been selected, one of the selected print jobs is deleted. The print jobs can be selected one by one, and when the user presses the start key 3014, the controller 110 executes the selected print job according to a set print condition. In a case where the saving setting is valid and a settable job is included, a saving setting screen to be described later is displayed.

Figure 4:
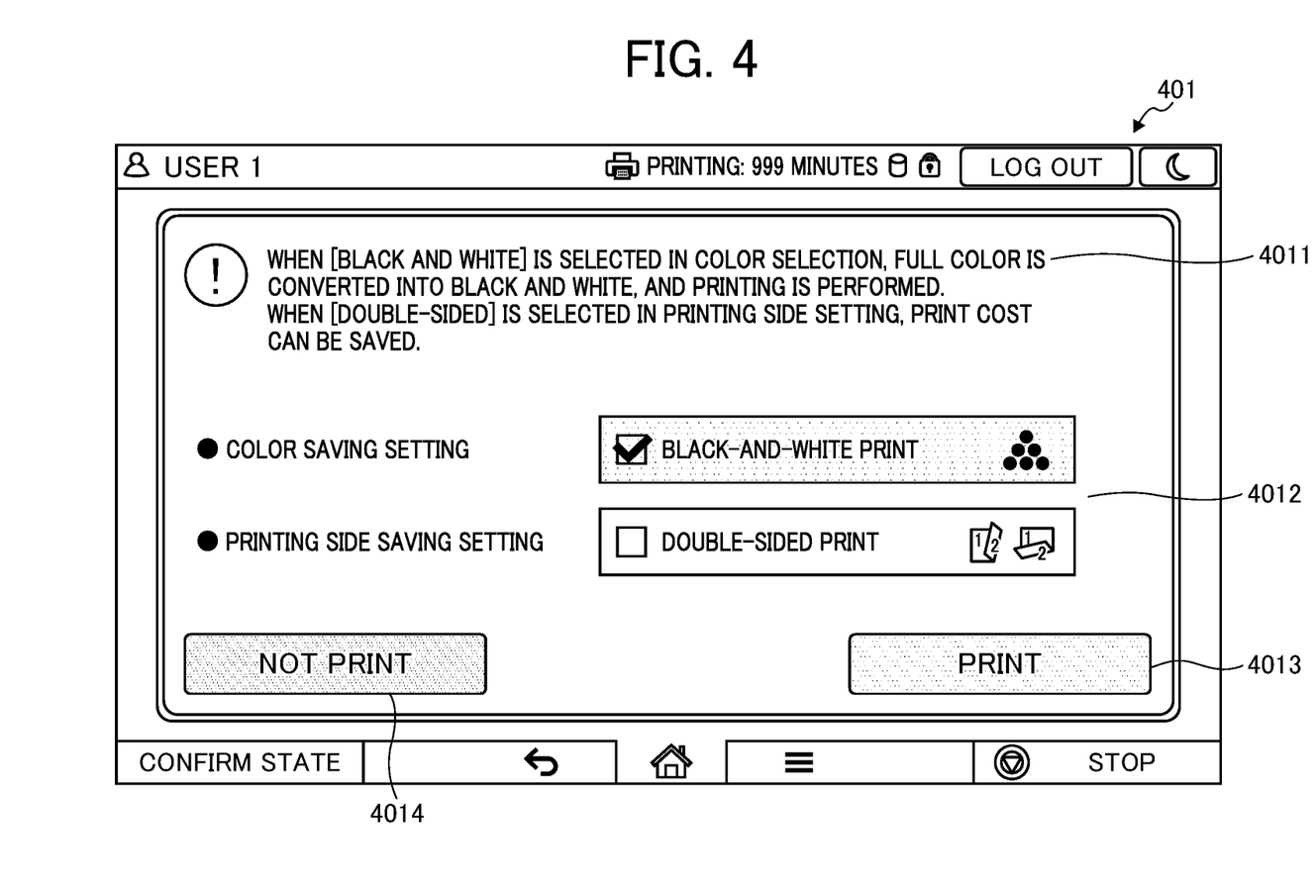
FIG. 4 is a diagram of an example of a saving setting screen.

FIG. 4 is a diagram of an example of the saving setting screen. The screen is displayed when the print job is selected from the job list 3011 in the operation screen and the start key 3014 is pressed. As illustrated in FIG. 4, on a saving setting screen 401, a pop-up screen indicating that the saving can be set at the time of printing regarding the print job executed by the user who has logged in the image forming apparatus 100 is displayed. Specifically, as the pop-up screen, a screen is displayed which includes a message 4011 urging the user to save cost, setting items 4012 to which the saving can be set, a print key 4013 for performing printing, and a cancel key 4014 for cancelling the printing.

Validity and invalidity of the setting of the setting item 4012 can be switched according to selection by the user. The controller 110 receives the notification indicating that the setting is valid from the setting item 4012, and executes the print job under the condition of which the saving setting is valid when the print key 4013 is pressed. In FIG. 4, it is indicated that two kinds of settings, including color saving and printing side saving, can be made as the items to which the saving can be set and the color saving is set to be valid.

In this way, in the present embodiment, the saving setting screen 401 is displayed after the start key 3014 illustrated in FIG. 3 has been pressed and the print key 4013 is pressed again in the saving setting screen 401 to actually start printing. Therefore, it is possible to make the user constantly confirm the saving setting.

Setting and change of the items to which the saving can be set illustrated in FIG. 4 can be changed before the start key 3014 illustrated in FIG. 3 is pressed. For example, when receiving the press of the setting change key 3013 displayed on the job list display screen 301 illustrated in FIG. 3 from the user, the controller 110 displays a setting item list in which the setting item is corresponded to a setting value of the item, and it is possible to set or change the setting value of the item selected from the setting item list by the user. In this way, in a case where the saving is set in advance, the controller 110 performs control so as not to display the saving setting screen 401 illustrated in FIG. 4. In addition, an administrator can optionally select and change a default value of setting of each item (for example, ON or OFF) displayed on the saving setting screen illustrated in FIG. 4.

In the present embodiment, as an item to which saving can be set in a case where the setting at the time of outputting the print job (for example, print setting such as color printing, printing side, the number of copies, and the like at the time of output) is set or changed, the print conditions such as color saving, printing side saving, and the like are exemplified. However, based on states of expendables of the image forming apparatus 100 at the time of outputting the print job (Capability information such as toner remaining amount and paper sheet remaining amount), whether to display the saving setting and the setting of the default value can be changed for each user. That is, for each user who has logged in, the controller 110 may read a print attribute of the print job to be output (for example, color printing or monochrome printing) and the states of the expendables of the image forming apparatus 100 at the time of outputting the print job which has been determined based on information detected by various sensors, display the item which needs to be saved at the time of outputting the print job (for example, color saving and printing side saving) on the operation screen of the control panel 120 as the saving setting item, and present the item to the user.

In addition, in a case where the print job is executed via the network, the controller 110 may read a line speed obtained from a communication device to connect to the network such as the network I/F 113 and a size of the print data to be output in the print job, determine whether or not the printing via the network takes time equal to or longer than a certain period of time or whether or not a line load equal to or larger than a certain value is applied. When the controller 110 determines that there is a possibility that a processing capability is deteriorated as a state of the image forming apparatus 100 at the time of outputting the print job in a case where it is determined that the printing takes time or the line load is applied, display the item (for example, color saving and printing side saving) on the operation screen of the control panel 120 as the saving setting item, and present the item to the user.

As illustrated in FIG. 3, in a case where the plurality of print jobs is selected and is collectively printed, the controller 110 can collectively determine whether or not to apply the saving setting to the selected plurality of jobs.

In FIG. 3, it is assumed that the saving setting screen 401 be displayed after the start key 3014 is pressed. However, a saving start (execution) key 3015 illustrated in FIG. 3 and the start key 3014 are displayed at the same time, and the user may execute the print job after selecting the one of the above keys. With this operation, without issuing an instruction after the start key 3014 is pressed and whether to set the saving has been set, it is possible to select to normally perform printing with one operation or to perform printing with saving. In addition, as the saving start key 3015, a start key which corresponds to a specific saving item may be displayed. For example, as the saving start key 3015, one or a plurality of start keys such as "double-sided printing start" or "toner saving start" may be set and display for each saving item.

Figure 5:
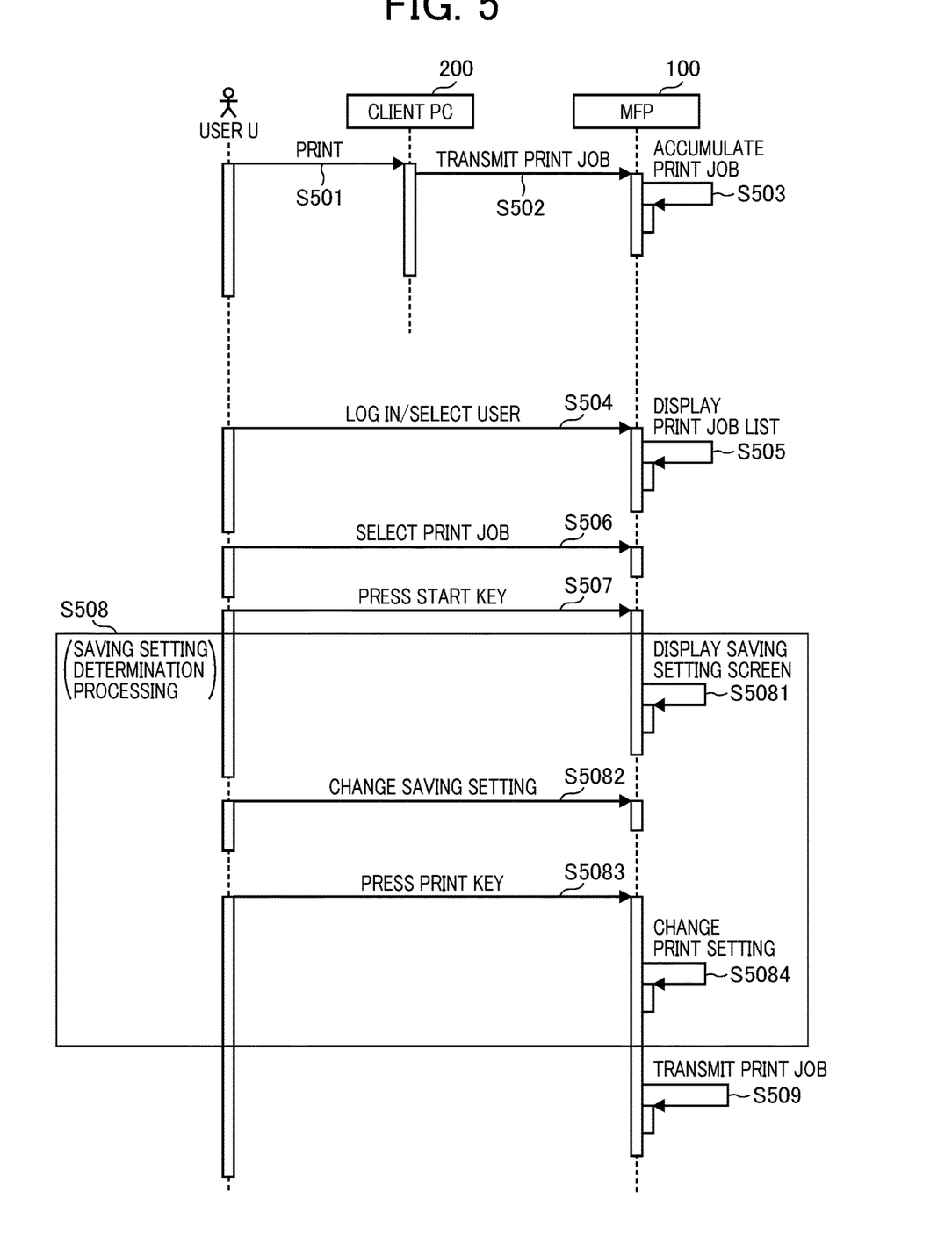
FIG. 5 is a sequence diagram illustrating operation of printing when saving setting is valid.

FIG. 5 is a print sequence diagram when the saving setting is valid. In FIG. 5, the image forming apparatus 100 is implemented by MFP, and the information processing apparatus 200 is implemented by a (client) PC operated by the user.

As illustrated in FIG. 5, first, when receiving an instruction for performing a print job from a user U (S501), the information processing apparatus 200 transmits the print job to the image forming apparatus 100, and the print job is accumulated in the image forming apparatus 100 (S502 and S503). In the following description, a case is described in which the print job is directly transmitted from the information processing apparatus 200 to the image forming apparatus 100. However, in actual, when the print job is transmitted from the information processing apparatus 200 to the print management server 300, the print job is accumulated in the print management server 300, and the user U operates and logs in the image forming apparatus 100, a list of the print jobs of the user U accumulated in the print management server 300 is obtained.

Thereafter, when the image forming apparatus 100 receives a login operation and a user selection operation from the user U (S504), the controller 110 of the image forming apparatus 100 displays the job list display screen 301 including the list of the print jobs (S505). When receiving selection of the print job to be output from the list of the print jobs displayed on the job list display screen 301 (S506) and receiving the press of the start key 3014 (S507), the controller 110 executes saving setting determination processing (S508). In the saving setting determination processing, when the start key 3014 is pressed regarding the print job selected from the list of the print jobs by the user U, the controller 110 checks the print attribute of the selected print job and the capability of the image forming apparatus 100 at that time. The controller 110 determines whether or not there is a setting which can be saved based on the above check. In a case where the controller 110 has determined that there is the setting which can be saved, the controller 110 displays the saving setting screen 401 illustrated in FIG. 4 (S5081). When the user U selects whether or not to apply the saving setting (S5082) and presses the print key 4013 (S5083), the controller 110 changes the print attribute of the print job based on the validation/invalidation of the saving setting (S5084). Details of the saving setting determination processing will be described later with reference to FIG. 6.

When executing the saving setting determination processing, the controller 110 of the image forming apparatus 100 transmits a print job to which the saving has been set based on the determination result or a print job to which the saving has not been set based on the determination result and performs printing (S509).

Figure 6:
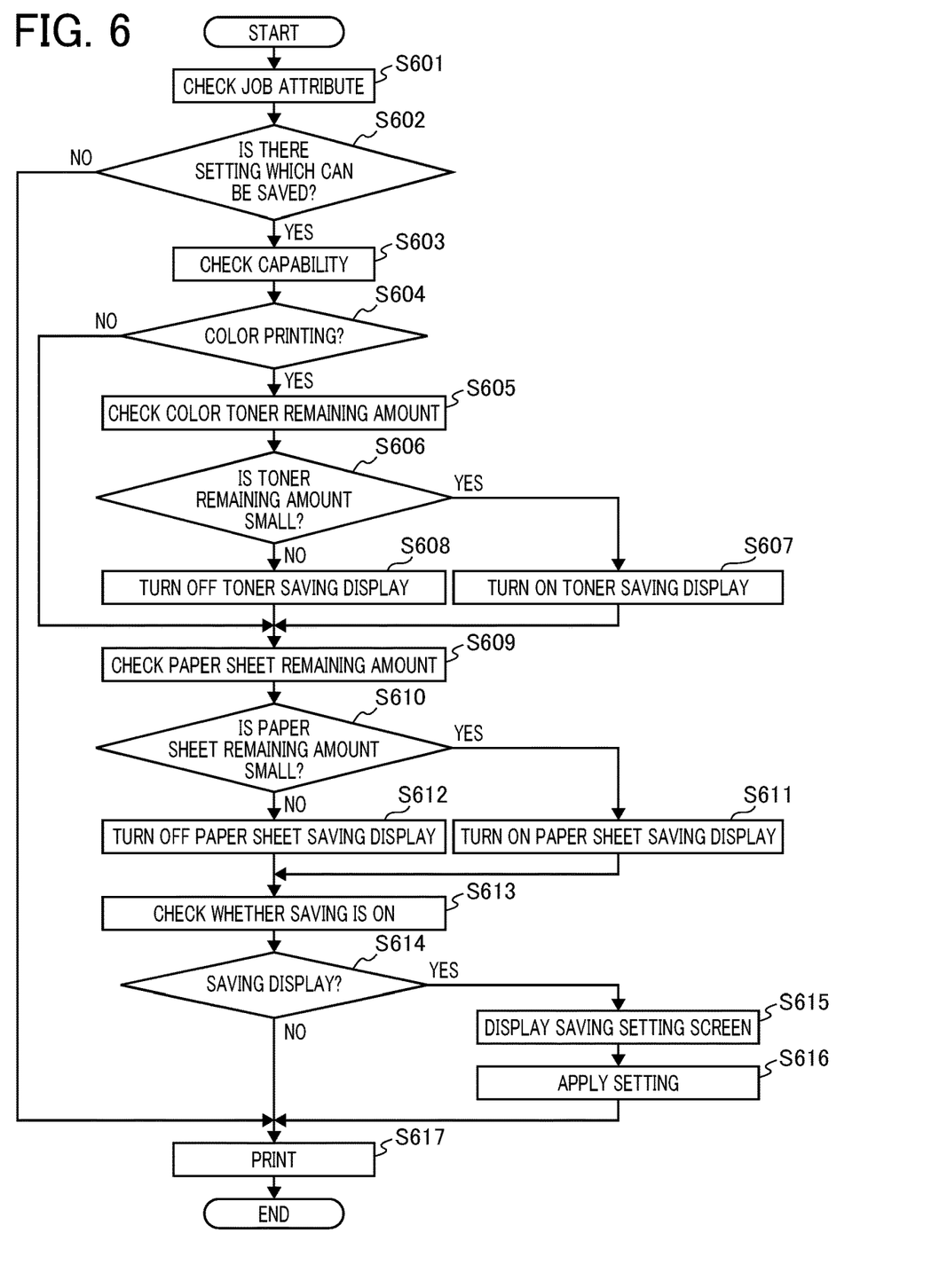
FIG. 6 is a flowchart of saving setting determination processing.

FIG. 6 is a flowchart of the saving setting determination processing. In the saving setting determination processing, display of the saving setting screen is controlled according to the capability of the image forming apparatus 100 at the time of printing and the print attribute of the print job.

The controller 110 of the image forming apparatus 100 checks the print conditions including the print attribute of the selected print job (S601). For example, the controller 110 reads whether the print job is color printing or monochrome printing from the print job. Subsequently, the controller 110 determines whether or not there is setting which can be saved at the time of printing the print job (S602). It is preferable that the item, to which the saving can be set, be set in the image forming apparatus 100 in advance.

In a case of determining that there is the setting which can be saved at the time of printing the print job (S602, Yes), the controller 110 checks the capability of the image forming apparatus 100 (S603). In this check, for example, the controller 110 reads the toner remaining amount and the paper sheet remaining amount of the image forming apparatus 100 at that time respectively detected by the toner remaining amount detection sensor 150 and the paper sheet remaining amount detection sensor 160. On the other hand, in a case where the controller 110 has determined that there is no setting which can be saved at the time of printing the print job (S602, No), the controller 110 proceeds to S617 and performs printing.

When the processing in S603 is executed, the controller 110 determines whether or not the print job is a print job for performing color printing based on the check result in S601 (S604). In a case where it has been determined that the print job is the print job for performing the color printing (S604, Yes), the controller 110 checks a toner remaining amount of each color (Y, M, C, and K) of the image forming apparatus 100 at this time based on the check result in S603 (S605).

The controller 110 of the image forming apparatus 100 determines whether or not the toner remaining amount of each color is equal to or less than a predetermined threshold (S606). In a case where it has been determined that the toner remaining amount of each color is equal to or less than the predetermined threshold (S606, Yes), the controller 110 determines that the toner remaining amount of each color is small, and turns ON the display of toner saving (change monochrome display) as the item to which the saving can be set (S607). On the other hand, it has been determined that the toner remaining amount of each color is larger than the predetermined threshold (S606, No), after turning OFF the display of the toner saving (monochrome display) as the item to which the saving can be set (S608), the controller 110 checks the paper sheet remaining amount of the image forming apparatus 100 (S609).

The controller 110 determines whether or not the paper sheet remaining amount of the image forming apparatus 100 is equal to or less than a predetermined threshold (S610). In a case where it has been determined that the paper sheet remaining amount of the image forming apparatus 100 is equal to or less than the predetermined threshold (S610, Yes), the controller 110 determines that the paper sheet remaining amount of the image forming apparatus 100 is small and turns ON the display of paper sheet saving (double-sided, intensive change) as the item to which saving can be set (S611). On the other hand, in a case where the controller 110 has determined that the paper sheet amount of the image forming apparatus 100 is larger than the predetermined threshold (S610, No), after turning OFF the display of the paper sheet saving (double-sided, intensive change) as the item to which the saving setting can be set (S612), the controller 110 checks a setting state of the item which has been checked regarding the print job (S613).

The controller 110 of the image forming apparatus 100 determines whether or not at least one or more the items to which saving can be set are turned ON based on the check result in S613 (S614). In a case where it has been determined that at least one or more items are turned ON (S614, Yes), the controller 110 displays the saving setting screen 401 illustrated in FIG. 4 (S615). On the saving setting screen 401 displayed at this time, a pop-up screen is displayed in which setting values (for example, check in black and white printing) are set to the items to which the saving can be set and which have been determined to be turned ON in the check in S613.

The controller 110 receives a selection operation whether or not to apply setting to the item to which the saving can be set displayed on the saving setting screen 401 from the user U and changes the print condition of the print job according to the applied setting (S616), and executes the print job according to the changed print condition (S617). On the other hand, when it has been determined that at least one or more items are not turned ON (S614, No), the controller 110 executes the print job without displaying the saving setting screen 401 (S617).

In this way, in the present embodiment, based on the toner remaining amount and the paper sheet remaining amount of the image forming apparatus 100 at the time of outputting the print job, the capability information indicating the state of the expendables of the image forming apparatus 100 at the time of executing the print job, and the print conditions of the print data at the time of executing the print job, the item which needs to be saved (for example, expendables such as toner remaining amount and paper sheet remaining amount) and the print conditions of the print job (for example, print attribute such as color printing and monochrome printing) are confirmed, and the saving setting screen is displayed based on the confirmation result, and the user is urged to make selection. Therefore, it is possible to display the saving setting screen corresponding to the state of resources necessary for performing printing by the image forming apparatus 100 and reduce print cost without deterioration in convenience of the user who desires to normally print. Furthermore, it is possible to easily make saving setting and change the saving setting.

That is, in the image forming apparatus 100 which executes the print job and prints the print data on a medium, the control panel 120 receives selection of one or a plurality of print jobs from the user, the sensor (for example, toner remaining amount detection sensor 150 and paper sheet remaining amount detection sensor 160) detects the state of the expendables of the image forming apparatus 100, and the controller 110 displays the saving setting screen 401 to make the saving setting regarding the expendables on the control panel 120 regarding the print job selected by the user based on the information indicating the state of the expendables at the time of executing the print job and the print conditions of the print data, executes the print job according to the saving setting of the expendables set by the user, and prints the print data on the medium. Therefore, it is possible to print the print data according to the setting intended by the user (print condition and state of expendables of image forming apparatus 100).

In addition, in a case where the controller 110 includes the network I/F 113 to connect to the network and executes the print job via the network, the controller 110 reads the line speed or the size of the print data obtained from the network I/F 113 and determines whether or not printing via the network takes time equal to or longer than a certain period of time. In a case where the controller 110 has determined that the printing via the network takes time equal to or longer than a certain period of time, the controller 110 displays the saving setting screen 401 regarding use of the color printing and/or double-sided printing on the control panel 120. Therefore, it is possible to make the saving setting in consideration of a network load and a printing time.

Furthermore, the controller 110 displays the print job execution screen on the control panel 120 to execute the print job which is the print job execution screen (job list display screen 301) in which the saving start key 3015 to execute the print job according to the saving setting and the start key 3014 to execute the print job without making the saving setting are displayed, receives selection of either one of the saving start key 3015 or the start key 3014 from the user, and executes the print job. Therefore, the user can select whether to normally print with one operation or to print with saving.

Furthermore, the controller 110 displays the print job execution screen on which one or the plurality of saving start keys 3015 is set for each item to which the saving is set, and executes the print job in response to the selection of any one of the saving start keys 3015 from the user. Therefore, the user can perform printing according to the saving setting set for each saving item with one operation.

In addition, the controller 110 displays the saving setting screen 401 on the control panel 120 for each user. Therefore, the saving setting screen 401 can be displayed for each of the plurality of users.

As described above, according to at least one embodiment of the present invention, the prim data can be printed according to the settings intended by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPG), and conventional circuit components arranged to perform the recited functions.

The invention claimed is:

1. An image forming apparatus, comprising:
   a control panel configured to receive selection of a print job from a user;
   a sensor configured to detect a state of an expendable of the image forming apparatus;
   an image forming device configured to form an image on a recording medium; and
   processing circuitry configured to
      control the control panel to display, after receiving the selection of the print job and an instruction to start printing from the user, a saving setting screen for setting a saving setting of the expendable in the print job, based on information indicating a state of the expendable at the time of executing the print job and a print condition of print data indicated by the print job, wherein the saving setting reduces an amount of the expendable used to form an image of the print data; and
      execute the print job according to the set saving setting of the expendable that is set using the saving setting screen, to control the image forming device to form the image of the print data.

2. The image forming apparatus according to claim 1, wherein the information indicating the state of the expendable is a toner remaining amount detected by the sensor, and
   the processing circuitry is further configured to display the saving setting screen on the control panel based on the toner remaining amount at a time of executing the print job and the print condition of the print data.

3. The image forming apparatus according to claim 1, wherein the print condition of the print data is at least one of use of color printing and use of double-sided printing obtained from the print job, and the processing circuitry is further configured to display the saving setting screen regarding at least one of the use of the color printing and the use of the double-sided printing on the control panel.

4. The image forming apparatus according to claim 3, further comprising:
   a communication device configured to control connection of the image forming apparatus with a network,
   wherein, when the print job is received via the network, the processing circuitry is further configured to
      obtain at least one of a line speed of the network and a size of the print data from the communication device;
      determine whether or not a time for printing is equal to or longer than a certain period of time; and
      display the saving setting screen regarding at least one of the use of the color printing and the use of the double-sided printing on the control panel based on a determination that the time for printing is equal to or longer than the certain period of time.

5. The image forming apparatus according to claim 1, wherein the processing circuitry is further configured to
   display a print job execution screen for executing the print job on the control panel, the print job execution screen including a saving execution key to execute the print job according to the saving setting and an execution key to execute the print job without making the saving setting, and
   in response to selection of one of the saving execution key and the execution key from the user, the processing circuitry is further configured to execute the print job according to selected one of the saving execution key and the execution key.

6. The image forming apparatus according to claim 5, wherein the saving execution key includes a plurality of saving execution keys each corresponding to each item to which saving is set, and
   in response to a selection of any one of the saving execution keys from the user, the processing circuitry is further configured to execute the print job while applying saving to one of the items corresponding to the selected saving execution key.

7. The image forming apparatus according to claim 1, wherein the processing circuitry is further configured to display the saving setting screen on the control panel specific to the user.

8. The image forming apparatus of claim 1, wherein the processing circuitry is further configured to control the control panel to display the saving setting screen after the user presses a start key.

9. The image forming apparatus of claim 1, wherein the processing circuitry is further configured to determine a content of the saving setting screen after the user presses a start key.

10. An image forming method executed by an image forming apparatus, the method comprising:
    receiving selection of a print job from a user via a control panel;
    obtaining information indicating a state of an expendable of the image forming apparatus at the time of executing the print job from a sensor;
    displaying, on the control panel, after receiving the selection of the print job and an instruction to start printing from the user, a saving setting screen for setting a saving setting of the expendable in the print job based on the information indicating a state of the expendable and a print condition of print data indicated by the print job, wherein the saving setting reduces an amount of the expendable used to form an image of the print data; and executing the print job according to the set saving setting of the expendable that is set using the saving setting screen, to control the image forming apparatus to form the image of the print data on a recording medium.

11. A non-transitory recording medium which, when executed by processing circuitry, cause the processing circuitry on an image forming apparatus to perform an image forming method comprising:

receiving selection of a print job from a user via a control panel;

obtaining information indicating a state of an expendable of the image forming apparatus at the time of executing the print job from a sensor;

displaying, on the control panel, after receiving the selection of the print job and an instruction to start printing from the user, a saving setting screen for setting a saving setting of the expendable in the print job based on the information indicating a state of the expendable and a print condition of print data indicated by the print job, wherein the saving setting reduces an amount of the expendable used to form an image of the print data; and executing the print job according to the set saving setting of the expendable that is set using the saving setting screen, to control the image forming apparatus to form the image of the print data on a recording medium.

\* \* \* \* \*